Figure 4:
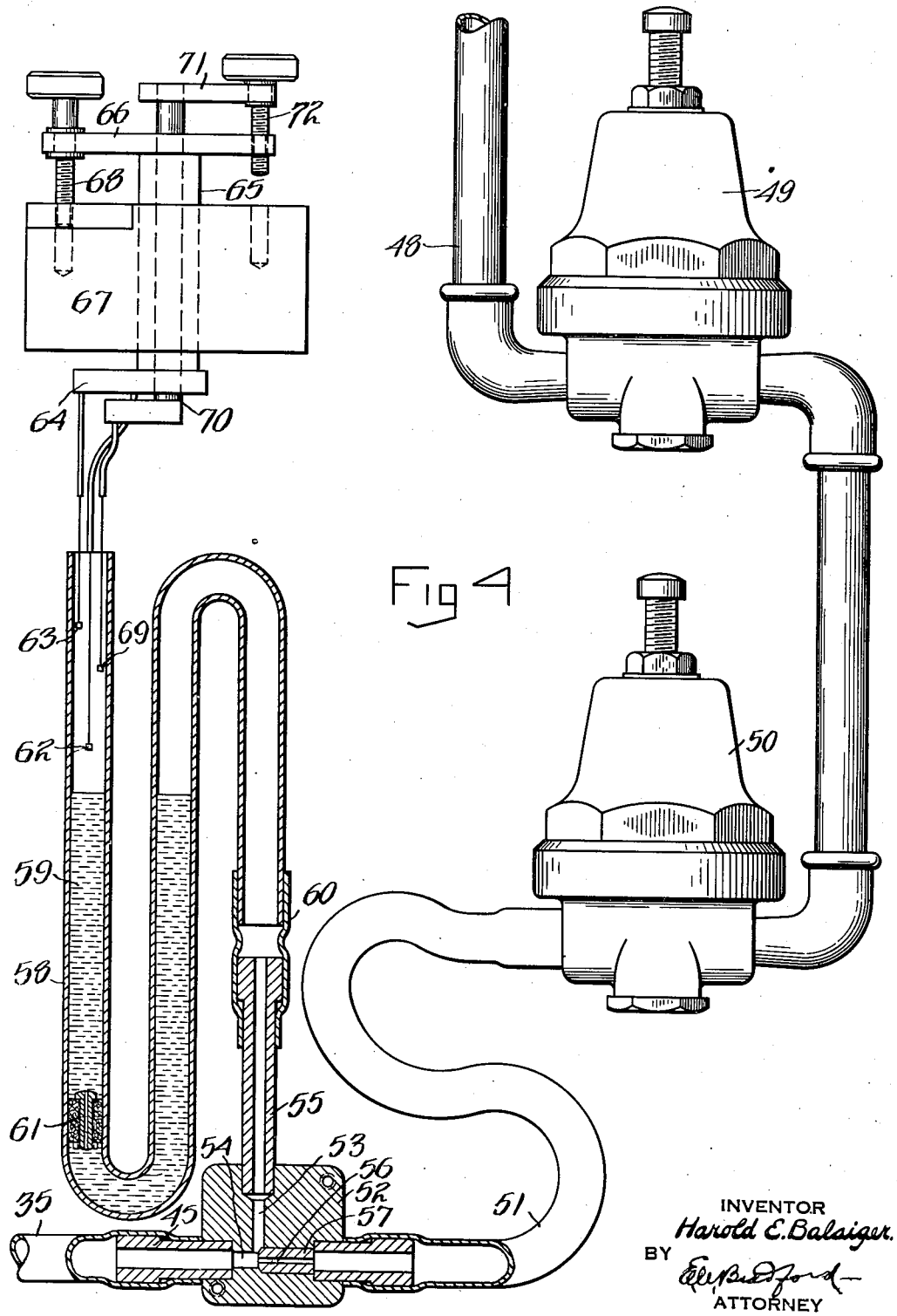

May 14, 1935.   H. E. BALSIGER   2,001,447
AUTOMATIC CONTROL MECHANISM
Filed March 12, 1932   3 Sheets-Sheet 1
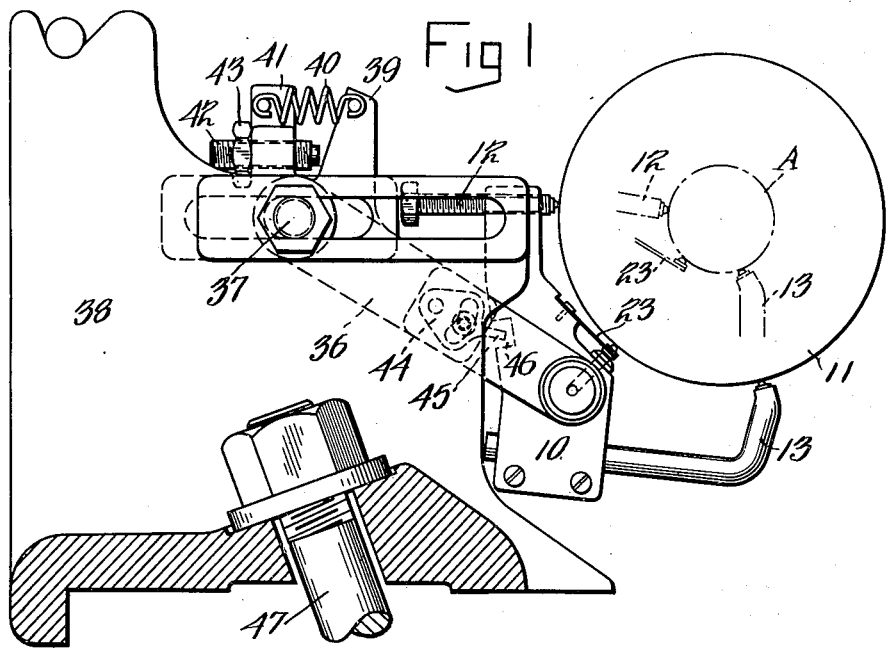
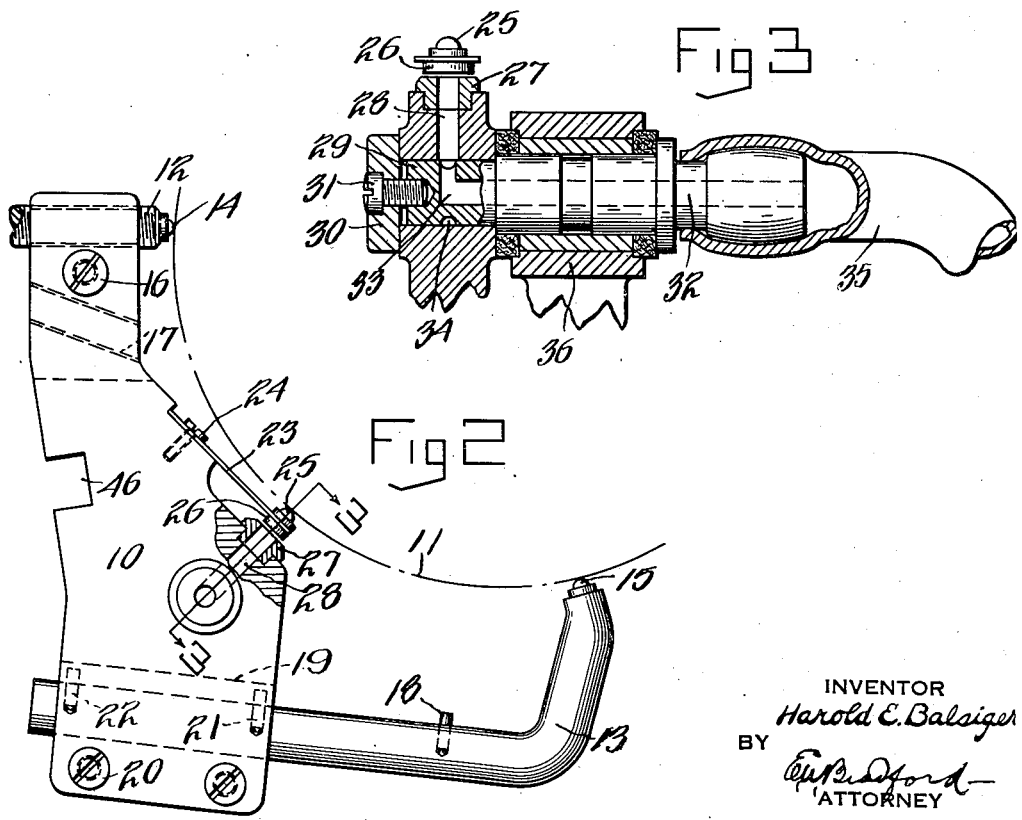
INVENTOR
Harold E. Balsiger
BY
ATTORNEY May 14, 1935.  H. E. BALSIGER  2,001,447
AUTOMATIC CONTROL MECHANISM
Filed March 12, 1932   3 Sheets-Sheet 2

INVENTOR
Harold E. Balsiger.
BY
ATTORNEY

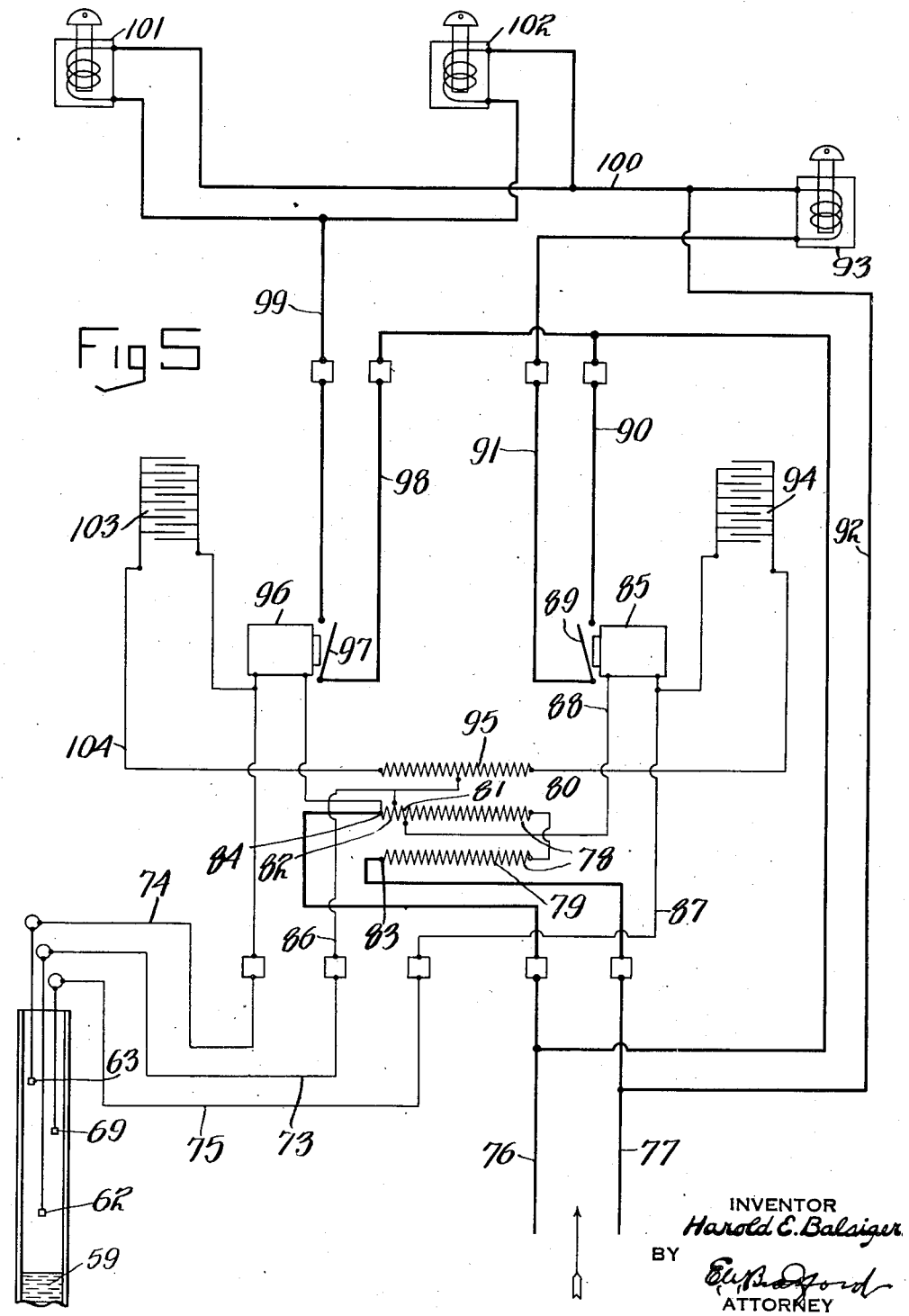

Patented May 14, 1935

2,001,447

UNITED STATES PATENT OFFICE 2,001,447

AUTOMATIC CONTROL MECHANISM

Harold E. Balsiger, Waynesboro, Pa., assignor to Landis Tool Company, Waynesboro, Pa., a corporation of Pennsylvania Application March 12, 1932, Serial No. 598,498

20 Claims. (Cl. 51—165)

This invention relates to control mechanisms for machine tools and is designed particularly with a view to its use with grinding machines.

An object of the invention is to provide means responsive to very small variations in the size of the work for controlling the grinding of the work.

A further object is to provide a gage device using a jet of fluid, the pressure of which varies with the dimensions of the work piece and in which variation in pressure is recorded in suitable manner or is caused to control certain mechanism on the machine with which the gage is used.

A still further object is to provide means whereby variation in the pressure of the said jet will cause various parts of a machine to function at predetermined points in a grinding operation.

Referring to the accompanying drawings which are made a part hereof and on which similar reference characters indicate similar parts, Figure 1 is an end elevation of that part of the device which engages the work piece, Figure 2, a more detailed view on an enlarged scale of the work engaging elements of the device, Figure 3, a sectional view of the air nozzle and the connections to the air gage, Figure 4, a front elevation of a portion of the piping arrangement showing the pressure gage in section, together with electrical connections, and Figure 5, a diagrammatic view of the electrical circuits which are controlled by the gage.

In carrying out the invention means are provided on a grinding machine for directing a jet of air or other fluid against a pad or other obstruction in such a manner that as the work is decreased in size the restriction between the jet and the pad will be decreased in size to limit the freedom with which the fluid may issue out through the restriction. A restricting of the fluid in turn will build up a pressure in advance of the jet and means are provided for causing this increasing pressure to operate suitable mechanism on a machine with which the device is associated all as will be more fully described hereinafter.

In the drawings numeral 10 indicates a block in which are mounted two adjustable work engaging elements consisting of a screw 12 and a bent finger 13. The screw and the finger have work engaging contacts 14 and 15. The screw 12 is longitudinally adjustable in the upper end of the block and is secured in adjusted position by means of a clamping plate held by a screw 16. The block is also provided with a threaded aperture 17 for receiving the screw 12, this aperture being positioned at an angle to the position in which it is shown in Figure 2 for use in gaging work of a smaller diameter, such as shown in dotted line position A in Figure 1. The finger 13 is provided with pins 18, 21 and 22 which rest on sockets in the lower end of the block, the pins serving to prevent rotation of the finger in the block. The finger is held upon the block by means of a plate 19 secured by screws 20. When gaging work of relatively large diameter the finger will be in the position shown in Figure 2; the finger, however, may be moved so that the two pins 18 and 21 will be held in the plate instead of pins 21 and 22 as shown in Figure 2. A spring 23 is secured to the block by means of a screw 24 and this spring carries on its free end a contact element 25 adapted to engage the surface of the work 11. Directly under the rear flat side 26 of the contact element is a nozzle 27 which is tightly secured in the block 10. A hole in this nozzle registers with a bore 28 in the block. The block 10 is supported on a plug 29 and is secured to the plug by means of a plate 30 and a screw 31. The plug is provided with an axial bore 32 which bore terminates in a radial bore 33 which registers with the bore 28 in the block 10. An annular groove 34 is provided in the plug to permit passage of fluid from the bore 32 into the bore 28 irrespective of the circumferential position of the block on the plug. A hose 35 is attached to the end of the plug for supplying fluid under pressure to the bore 32. The plug is carried on the lower end of an arm 36 and is freely rotatable in the arm to permit the contacts 14 and 15 both to come into contact with the periphery of the work.

The upper end of the arm 36 is pivotally attached to the base 38 by means of a stud 37 which passes through a slot in the base. The arm may be adjustable toward and from the work and secured in adjustable position by stud 37. The upper side of the arm 36 carries a lug 39 to which is connected a spring 40, the other end of the spring being connected to a lug 41 on the base 38. The purpose of the spring is to hold the work engaging parts in contact with the work piece. A stop screw 42 is threaded through the lug 41 and locked in adjustable position by a nut 43. The stop screw limits the movement of the arm 36 beyond a predetermined position when there is no workpiece in the machine and consequently nothing to stop movement of the arm. A plate 44 is pivotally and adjustably secured to the arm 36. This plate carries a finger 45 which projects into a notch 46 in the block 10 and limits the oscillation of the block beyond predetermined limits. The base 38 is secured to the work table of the machine by a clamping bolt 47.

From the description so far given it will be apparent that as the work is reduced in size the restriction between the nozzle 27 and the face 26 of the contact element 25 will be reduced in size. This decreases the jet of fluid issuing from the bore 28 and consequently tends to build up pressure in the line 35.

Means for utilizing this increasing pressure will now be described. The pipe 48 may represent a high pressure fluid line. This fluid may be line pressure and preferably will be fluid under relatively high pressure. The fluid may be air or any other suitable operating fluid under pressure. Under some circumstances water may be found feasible. Pressure reducing valves 49 and 50 of suitable construction may be provided between the high pressure line 48 and the line 51. This provides fluid under relatively low pressure in the line 51 and at the same time insures that the pressure in the line 51 will be practically constant. Any suitable pressure fluid line having fluid under proper and constant pressure may be substituted for line 51, in which case reducing valves 49 and 50 may be dispensed with.

The line 51 is connected to a block 52. This block is bored at 53 and 54. The hose or pipe 35 is connected to the block in register with the bore 54 and the pipe 55 is connected to register with the bore 53. Fluid from the line 51 passes through a restricted passage 56 provided in a plug 57 positioned with its open end adjacent the intersection of the bores 53 and 54. A manometer tube 58 is partially filled with some suitable liquid 59. This may be mercury or any other suitable liquid. The tube 58 is preferably U-shaped and one end of the U is continued in the form of an inverted U, one leg of which last named U is connected to the pipe or tube 55 by means of a sleeve or a connecting tube 60. In order to limit fluctuation of the liquid in the U-tube a restriction 61 may be provided in one leg of the tube. Contact elements 62 and 63 are positioned in the open end of one leg of the U and are mounted on a block 64 carried by a depending tube 65 which is secured on a support 66. The support 66 is mounted upon a block 67 and is adjustable vertically of the block by means of a screw 68. Rotation of the screw 68 as will be seen provides for vertical adjustment of the contacts 62 and 63 toward and from the surface of the mercury or other liquid in the manometer tube. A third contact 69 is positioned intermediate contacts 62 and 63 and is carried on a rod 70 which is secured to a support 71. This support in turn is mounted upon the arm 66 and is adjustable vertically on this arm by means of a screw 72. Rotation of the screw 72 serves to adjust the contact 69 with relation to the contact 63. Block 67 is secured in fixed position on some stationary portion of the machine. Contacts 62, 63 and 69 are connected to wires 73, 74, 75. A diagrammatic showing of the circuits controlled by contacts 62, 63 and 69 is given in Figure 5. Current from a suitable outside source is supplied through wires 76 and 77. This is high potential current which may be direct or alternating current. For the purpose of convenience in the present case lines 76 and 77 may be direct current through lines connected to the wheel drive motor. This circuit generally carries current at high potential which must be reduced either by a transformer or a resistance. Such resistance bank is shown as a whole at 78. The line current makes a complete circuit from line 77 through resistors 79, 80, 81 and 82 connected in series and so arranged that from the point 83 to point 84 there is a total voltage drop equivalent to the line voltage. The mercury switch contacts 62, 63 and 69 are preferably very low voltage, usually about ten volts. The resistors 79 and 80 are such as to provide the necessary voltage drop. For the purpose of better understanding the device all line voltage circuits are shown in heavy black lines while the ten volt or pilot circuits are shown in lighter lines.

From resistor 81 there is a ten volt circuit which operates a relay 85 as follows: Resistor 81 is connected through line wire 86 and 73 with contact 62, then through the mercury 59 to contact 69, thence through wires 75 and 87 with the relay 85 and from the other terminal of this relay circuit is completed through line 88 back to the resistor 81. Thus when mercury closes contacts 62 and 69 the relay 85 is energized. This closes switch 89 and closes contact through line 90 with line 76 and through line 91 and line 92 closes contact with line 77 to energize solenoid 93. The solenoid 93 may cause operation of any suitable mechanism or group of mechanisms on the machine with which the device is associated, for example, it may slow down rotation of the work or stop wheel feed toward the work when the work has been ground approximately to its finished size. A condenser 94 is connected through resistor 95 directly across the mercury contacts 62 and 69 to prevent sparking or arcing when the circuit is made or broken by the mercury. This coupled with the fact that the relay 85 is delicate requiring only a very small current to operate, reduces the burning and pitting of the contacts 62 and 69 to a minimum. When circuit is closed by the mercury between contacts 62 and 63 relay 96 is energized to close the switch 97. This closes circuit through line 98 with the lead-in line 76 and other lines 99 and 100 close circuit with the line 92 to lead-in line 77 to energize solenoids 101 and 102. The relays 85 and 96 may control any desired mechanism with which the device is associated such as stopping operation of the machine and restoring parts to the position for beginning a new operation after the work has been ground to finished size.

By means of the adjusting screw 72 the distance between contacts 69 and 63 may be controlled so as to control the amount of stock left for a finishing grinding operation.

A condenser 103 is connected through wires 104, 74, and resistance 95, wires 86 and 73 with the contacts 63 and 62 to reduce or prevent sparking and consequent pitting of the contact elements.

The operation of the device as a whole is as follows:

Arm 36 is positioned so that the spring 40 will bring contacts 14 and 15 into engagement with the periphery of the work. Screw 12 and arm 13 will be adjusted longitudinally so that when the contacts 14 and 15 are in engagement with the work there will be a slight aperture between the surface 26 and the end of the nozzle 27. Fluid under a predetermined pressure will be maintained in the line 51. This pressure will be kept as near constant as is possible by means of pressure reduction valves 49 and 50. Pressure fluid will flow through line 35 and bore 32 out through the nozzle 27. Fluid passing from the line 51 into line 35 will issue through a restriction at 56 which will increase its velocity at the mouth of the tube 57. Due to the venturi effect the velocity of the fluid at this point will create an area of low pressure in the bore 53. When the fluid is flowing freely through the orifice between the nozzle 27 and the surface 26, a decided reduction in pressure will be created on the surface of the liquid in the right leg of the U-tube or manometer. As the restriction adjacent the surface 26 becomes small, fluid will issue more slowly from the line 35. This will tend to decrease the aspirating effect of the jet at the mouth of the bore 53, and thus tend gradually to increase the pressure through this bore to the surface of the liquid in the manometer. The increased pressure in the bore 53, however, will be very little and will build up very gradually until the nozzle 27 has been brought into very close proximity to the surface 26. When the restriction has been cut down to a minimum at 26, pressure in the line 35 will approach the pressure in the line 51. Reduced flow at 26 will reduce the velocity of the fluid flowing through restriction 56 and this reduced velocity will upset the aspirating action and create a pressure in the bore 53 approximating the pressure in the line 35. The increase in pressure through the bore 53 will be rather sudden so that pressure on the liquid column in the manometer will be changed very suddenly from a negative or low pressure to a decidedly high positive pressure. This arrangement makes possible a minimum time lag between the time when the work is finished and the time when the mercury closes the electrical circuits. This will move the column of liquid upward in the left leg of the U-tube closing electrical contact between contact elements 62 and 69. Contact points 14 and 15 are always in engagement with the work. The size of the orifices at 26 will depend upon the size of the work. There is a definite relation between the flow of fluid through the nozzle and the size of the work. The flow of fluid through the orifices moreover will have a definite relation to the rise of mercury in the manometer tube. When these contacts 62 and 69 are closed through the circuits heretofore described, relay 85 will be energized, switch 89 closed and solenoid 93 energized to effect operation of certain mechanism with which the device is connected, such as a slowing down of the wheel feed or slowing down rotation of the work, etc. The device will be so adjusted that when the work reaches finished size the restriction at the nozzle will be exceedingly fine. The pressure in bore 53 will then cause the mercury to close contact between 62 and 63. When contacts 63 and 62 are closed by the mercury body, relay 96 will be energized to close switch 97 and energize solenoids 101 and 102 to stop operation of the machine and to cause any other operations found necessary after the work has been ground to this finished size.

One result brought out by this construction is that for a very small variation in the size of the work piece there is a comparatively great increase in the pressure in the manometer tube. Movement of the column of liquid in the manometer tube is many times greater than the reduction in the size of the work. This provides a precision instrument that is exceedingly sensitive to very small changes in the size of the work and provides a control device so sensitive as to insure grinding or machining the work to a predetermined standard within limits heretofore practically impossble. If desired suitable graduations may be made on the manometer tube to indicate movement of the column of liquid on the tube and thus indicate the size of the work as it approaches finished size.

It will be obvious to those skilled in the art that various changes may be made in my device without departing from the spirit of the invention and therefore I do not limit myself to what is shown in the drawings and described in the specification, but only as indicated by the appended claims.

Having thus fully described my said invention, what I claim as new and desire to secure by Letters Patent, is:

1. A sizing device for a grinding machine having a pair of work engaging contact elements, a third contact element intermediate the first named contact elements, a source of fluid under pressure, a jet for permitting fluid to escape, the escape of fluid being decreased as the work is reduced in size, a restriction in the fluid line through which the escaping fluid passes, a conduit having its exit end adjacent the said restriction, said conduit containing a body of electrically conductive fluid, variation in the velocity of the fluid through said restriction causing movement of the said fluid, and a plurality of contact elements positioned to be closed by the said liquid as the velocity at the said restriction varies beyond a predetermined point, substantially as set forth.

2. A gaging device for work for a grinding machine comprising a block having a pair of work engaging contact elements mounted thereon, a second contact element resiliently mounted on said block intermediate the first contact elements, a nozzle on said block positioned adjacent said last named contact element, a source of fluid under pressure, said fluid being permitted to escape between the said nozzle and the third contact element, reduction in the size of the work decreasing the restriction between the nozzle and the contact element and increasing the pressure of the fluid in advance of the nozzle, and means controlled by variation in the pressure of the fluid for controlling operative mechanism on the grinding machine, substantially as set forth.

3. A control device for a grinding machine comprising a nozzle positioned adjacent the periphery of the work being ground, means associated therewith for causing a decrease in the flow of fluid through the nozzle as the work is reduced in size, a fluid line containing fluid under constant pressure, a fluid line connected to said nozzle, a restricted passage between said last named fluid line and said first named fluid line, a tube having an opening adjacent the discharge end of said restriction, so that change in the velocity of the flow of the fluid produces a variation in pressure in the tube, and means controlled by the variation in the pressure in the tube for controlling operation of mechanism on the grinding machine.

4. A device for controlling a plurality of mechanisms in response to the decreasing diameter of an object which is being reduced in size comprising an element maintained in contact with said object, a second element adjacent the first named element, means for moving said second element toward said first named element as the diameter of the object is decreased, a fluid conduit connected to and discharging fluid through the space between said elements, the flow of fluid through said space varying in response to the change in the size of the work, said conduit having a restricted passage for producing a velocity change in the flow of the fluid, said velocity change being varied by the variation in the flow through said space between the elements, and means responsive to the velocity flow in the fluid through said restricted passage for controlling the operation of said plurality of mechanisms.

5. A device of the kind described comprising a support having a pair of contact elements thereon, said contact elements being adapted to engage the periphery of the work being ground, a third contact element, a movable element spaced from said last named contact element, the distance between the movable element and the stationary element decreasing as the work is reduced in size, means for causing fluid under pressure to issue through the space between the last named contact element and the movable element, and means for utilizing the change of pressure due to a change in the size of the restriction between the said stationary element and the said contact element for controlling the grinding action, substantially as set forth.

6. A device of the kind described comprising a support having a pair of contact elements thereon, said contact elements being adapted to engage the periphery of the work being ground, a third contact element, a movable element spaced from said last named contact element, the distance between the movable element and the stationary element decreasing as the work is reduced in size, means for causing fluid under pressure to issue through the space between the last named contact element and the movable element, means for utilizing the change of pressure due to a change in the size of the restriction between the said stationary element and the said contact element, and means controlled by said variation in pressure for effecting operation of movable mechanism, substantially as set forth.

7. In a grinding machine, a work gaging device comprising a U-tube having a body of electrically conductive liquid therein, a plurality of contacts positioned in one end of said tube, a block having a port drilled therethrough and having a second port drilled to connect with the first named port, one end of said U-tube being connected to the said second port, a body of fluid under substantially constant pressure connected with the first named port, the other end of said port being in communication with a fluid nozzle through which fluid under pressure may escape, the said nozzle being positioned adjacent the surface of the work to be ground, the distance between the nozzle and the surface of said work controlling the rate of escape of fluid, variation in the size of the work causing a variation of velocity through the first named port in the said block, a decrease in the velocity flow through the said port causing an increase in pressure on the liquid in the said tube, and means controlled by variation in the position of the liquid in said tube due to said pressure for controlling operation of the grinding machine, substantially as set forth.

8. A gaging device for a grinding machine, comprising a fluid conduit, a nozzle for discharging the fluid therefrom, means responsive to a change in size of the work for varying the flow of fluid from the nozzle, said conduit having a restricted passage for producing a velocity change in the flow of the fluid, which velocity change is responsive to the flow of fluid through the nozzle, a tube connected to said conduit at said restricted passage so that the flow of fluid through the restricted passage is past the end of said tube whereby a change in the velocity of the flow of the fluid through said restricted passage produces a variation of the pressure in the tube, and means controlled by the variation in the pressure in the tube for controlling the action of the grinding machine.

9. A gaging device for a grinding machine, comprising a fluid conduit, a nozzle for discharging the fluid therefrom, means responsive to a change in size of the work for varying the flow of fluid from the nozzle, said conduit having a restricted passage for producing a velocity change in the flow of the fluid, which velocity change is responsive to the flow of fluid through the nozzle, a tube connected to said conduit at said restricted passage so that the flow of fluid through the restricted passage is past the end of said tube whereby a change in the velocity of the flow of the fluid through said restricted passage produces a variation of the pressure in the tube, and electric contacts controlled by the variation in the pressure in the tube, said electric contacts controlling the action of the grinding machine.

10. A gaging device for a grinding machine, comprising a fluid conduit, a nozzle for discharging the fluid therefrom, means responsive to a change in size of the work for varying the flow of fluid from the nozzle, said conduit having a restricted passage for producing a velocity change in the flow of the fluid, said velocity change varying in response to a change in the flow of fluid through said nozzle, and means connected to said conduit at said restricted passage and controlled by the velocity change at the restricted passage for controlling the action of the grinding machine.

11. A gaging device for a grinding machine, comprising a fluid conduit, a nozzle for discharging the fluid therefrom, means responsive to the change in the size of the work for varying the flow of fluid from the nozzle, said conduit having a restricted passage for producing a velocity change in the flow of the fluid, which velocity change is responsive to the flow of fluid through the nozzle, a tube connected to said conduit at said restricted passage so that the flow of fluid through the restricted passage is past the end of said tube whereby a change in the velocity of the flow of the fluid through said restricted passage produces a variation of the pressure in the tube from a pressure less than atmospheric to a pressure exceeding atmospheric as the nozzle flow decreases, and means controlled by the variation in pressure on the tube for controlling the action of the grinding machine.

12. A gaging device for a grinding machine, comprising a fluid conduit, a nozzle for discharging fluid therefrom, means responsive to a change in size of the work for varying the flow of fluid from the nozzle, said conduit having a restricted passage producing a velocity change in the flow of the fluid, a tube connected to said conduit, a manometer connected to said tube and having therein an electric conductive liquid and electric contacts which are normally spaced away from said liquid, said tube being connected to said conduit at said restricted passage so that the flow of fluid through the restricted passage is past the end of said tube whereby a change in the velocity of the flow of the fluid through said restricted passage produces a variation of the pressure in the tube and the shifting of the liquid in the manometer, said electric contacts operating to control the grinding action of the machine.

13. A gaging device for a grinding machine, comprising a fluid conduit, a nozzle for discharging fluid therefrom, means responsive to a change in size of the work for varying the flow of fluid from the nozzle, said conduit having a restricted passage producing a velocity change in the flow of the fluid, a tube connected to said conduit, a manometer connected to said tube and having therein an electric conductive liquid, a series of electric contacts disposed at different distances from the surface of the liquid, said tube being connected to said conduit at said restricted passage so that the flow of fluid through said restricted passage is past the end of said tube whereby a change in the velocity in the flow of the fluid through said restricted passage produces a variation in the pressure in the tube and a shifting of the liquid in the manometer, said electric contacts operating to control the various grinding operations in the machine.

14. A gaging device for a grinding machine, comprising a fluid conduit, a supporting frame, a work engaging member carried thereby and contacting with the surface being ground during the grinding operation, a nozzle for discharging fluid from the conduit supported by said frame, and means responsive to a change in the size of the work for varying the flow of the fluid from the nozzle, and means controlled by the variation in the flow of the fluid from the nozzle for controlling the action of the grinding machine.

15. A gaging device for a grinding machine, comprising a fluid conduit, a supporting frame, contacting elements carried by said supporting frame and engaging the surface being ground during the grinding operation, a nozzle for discharging fluid from the conduit supported by said frame, means responsive to a change in the size of the work for varying the flow of fluid from the nozzle, and means controlled by the variation in the flow of the fluid from the nozzle for controlling the action of the grinding machine.

16. A gaging device for a grinding machine, comprising a fluid conduit, a supporting frame, contacting elements carried by said supporting frame and engaging the surface being ground during the grinding operation, a nozzle fixed to said supporting frame for discharging fluid from the conduit, means associated with said nozzle whereby a change in the size of the work varies the flow of fluid from the nozzle, and means controlled by the variation in the flow of the fluid from the nozzle for controlling the action of the grinding machine.

17. A gaging device for a grinding machine, comprising a fluid conduit, a supporting frame, spaced work engaging members carried thereby and contacting with the surface being ground during the grinding operation, a nozzle for discharging fluid from the conduit fixed to said frame intermediate said elements and disposed relative to the surface of the work being ground so that variations in the size of the work will vary the flow of fluid from the nozzle, and means controlled by the variation of the flow of the fluid from the nozzle for controlling the action of the grinding machine.

18. A gaging device for grinding machines, comprising a fluid conduit, a supporting frame, spaced work engaging members carried thereby and contacting with the surface being ground, the points of contact of said members being substantially 90 degrees apart, a nozzle for discharging fluid from the conduit supported by said frame midway between said members and disposed so that the flow of fluid from the nozzle is controlled by the size of the work, yielding means for holding said members in contact with the work, and means controlled by the variation in the flow of the fluid from the nozzle for controlling the action of the grinding machine.

19. A gaging device for a grinding machine, comprising a fluid conduit, a supporting frame, work engaging members carried thereby and contacting with the surface being ground during the grinding operation, said work engaging members being independently adjustable on said supporting frame, yielding means for shifting said frame so as to hold said members in contact with the work, a stop for limiting the movement of the frame when there is no material for said members to contact with, a nozzle for discharging fluid from the conduit carried by said supporting frame and disposed so that the flow of fluid from the nozzle is controlled by the size of the work, and means controlled by the variation of the flow of the fluid from the nozzle for controlling the action of the grinding machine.

20. A gaging device for a grinding machine, comprising a fluid conduit, a supporting frame, work engaging members carried thereby and contacting with the surface being ground during the grinding operation, said work engaging members being independently adjustable on said supporting frame, yielding means for shifting said frame so as to hold said work engaging members in contact with the work, a stop for limiting the movement of the frame when there is no material for said members to contact with, a nozzle rigidly supported by said frame, a yieldingly supported member carried by the frame and disposed between said nozzle and the work and adapted to contact with the work during the grinding operation, said member being initially spaced from the nozzle at the beginning of the grinding operation to permit flow of fluid from the nozzle, said nozzle being movable toward said member as the work diminishes in size so that the flow of fluid from the nozzle is controlled by the size of the work, and means controlled by the variation of the flow of the fluid from the nozzle for controlling the action of the grinding machine.

HAROLD E. BALSIGER.